United States Patent Office 3,432,226
Patented Mar. 11, 1969

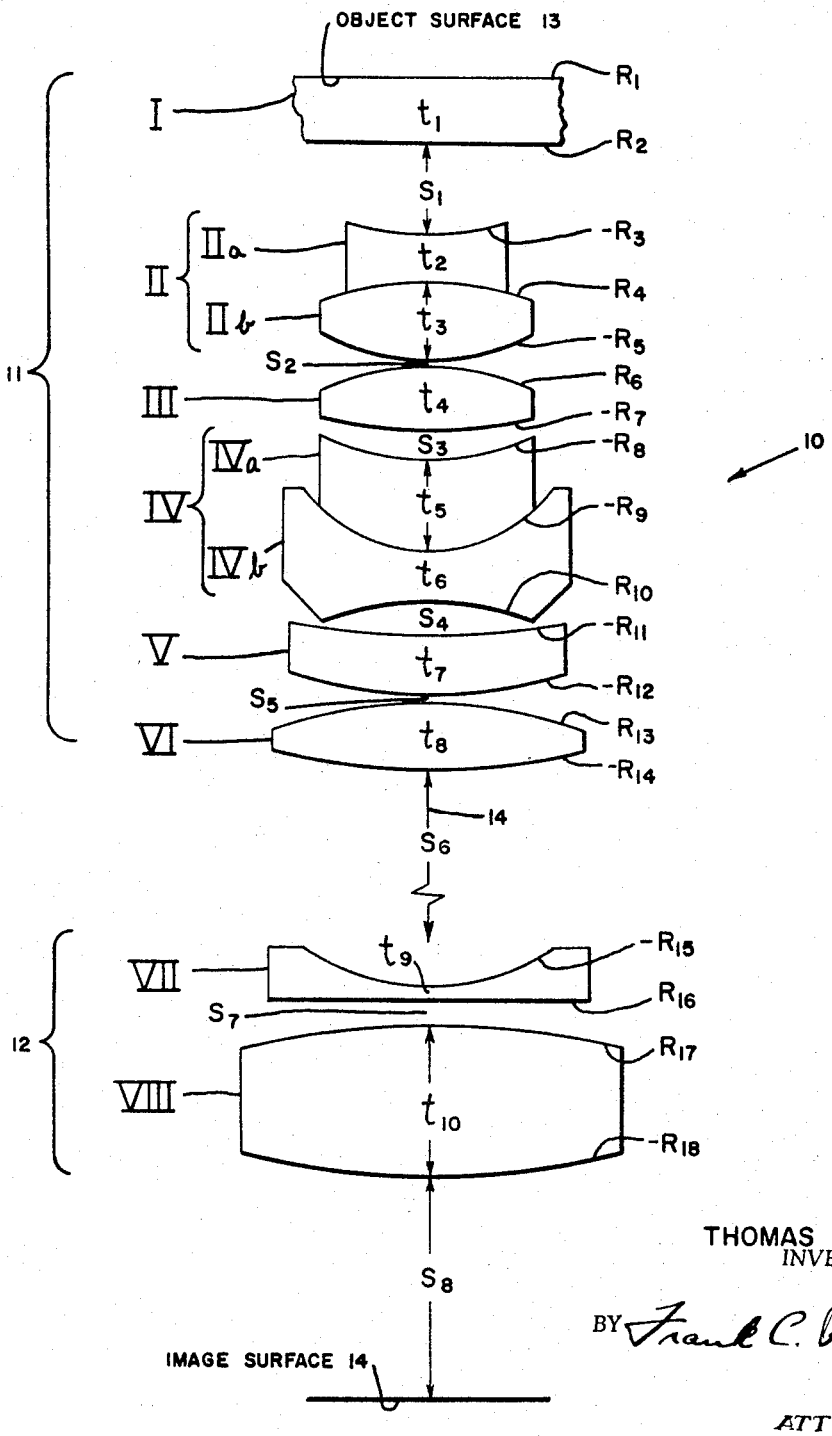

3,432,226
PROJECTION OBJECTIVE HAVING LARGE NUMERICAL APERTURE AND HIGH MAGNIFICATION
Thomas S. Bird, Rochester, N.Y., assignor to Bausch & Lomb Incorporated, Rochester, N.Y., a corporation of New York
Filed July 13, 1966, Ser. No. 564,886
U.S. Cl. 350—214                                5 Claims
Int. Cl. G02b 9/64

The present invention relates to an image-forming optical system such as a projection objective of the reversed telephoto type and more particularly it relates to improvements in complex forms of such objectives which are used at high magnification.

Such an objective is quite uncommon when used in other than photographic apparatus, such as cameras, and in the present device the reversed telephoto high magnification projection lens is working at finite conjugates to produce an image magnification of substantially 115×. Usually, objectives intended for copy apparatus have been characterized by a symmetrical form or nearly so whereby a good state of aberrations of the imagery at near unity magnification is guaranteed. Due to the fact that the projection objective in the present invention is used at substantially 115×, the reversed telephoto type of optical system lends itself very well to the solution of the problem, the objective nevertheless being used in the manner of a microscope objective wherein the numerical aperture is extraordinarily high, the value thereof being substantially .33. Therefore, the reversed telephoto system instead of being used in its usual form with one conjugate at infinity, the wide angle or long conjugate side of the projection lens has a finite focus while the object space of the lens system is small. The object space always includes a relatively thick cover glass between the object surface and the front lens of the optical system.

In view of the above-mentioned facts, it may be stated that the principal object of the present invention is to provide a reversed telephoto lens system which works at finite unequal conjugates having a high ratio and wherein the numerical aperture on the object side of the system is extremely large in the order of .33.

It is a further object of this invention to produce such a device which is distinguished by an excellent flatness of field and a very high resolution over the entire format.

A further object is to provide such a device which achieves an extraordinarily large numerical aperture and magnification without adding excessive spherical aberration to the image, and wherein a relatively long working distance is achieved in this type of optical system.

A still further object is to provide such a device having an adequately large field while being adjustable in certain air spaces and lens thicknesses to provide a correction for achieving superior image quality where required.

Further objects and advantages will be apparent in the combination and arrangement of the parts of the aforesaid optical system and in the details of construction thereof by reference to the drawing wherein the single figure illustrates a preferred form of the present invention.

Said preferred form as set forth hereinafter relates to a projector objective of the reversed telephoto type having a relatively large numerical aperture of substantially .33 and a magnification of substantially 115.0×.

With reference to the drawing, the optical system or objective is generally designated by numeral 10 and is made up of two optically aligned functional groups of lenses which are a front positive or main lens group designated 11 and a rear wide angle lens group 12, said group being aligned on an optical axis 14. Said front lens group 11 is composed of a front cover glass designated I which lies in contact with an object surface 13.

Spaced away from the cover glass I by an axial distance $S_1$ is a positive meniscus lens member designated II which is concave toward the cover glass I and includes a front double concave lens element designated IIa which lies in contact with a rear double convex lens element IIb.

Closely spaced from lens element IIb by an axial distance $S_2$ is a singlet double convex lens member designated III, and at an axial distance $S_3$ rearwardly thereof is located a double concave doublet lens member designated IV. The second doublet IV comprises a front positive meniscus lens element designated IVa which abuts a double concave lens element IVb along an interface.

Rearwardly of element IVb is spaced a positive meniscus lens member V at an axial distance designated $S_4$, said lens member being concave toward the object surface 13. Lastly in the main lens group 11, a double convex lens member designated VI is spaced from lens V by an axial distance $S_5$.

In the rear or wide-angle lens group 12 is provided a front preferably plano concave lens member VII which is concave toward the front lens group and is spaced therefrom at a long axial distance designated $S_6$. Spaced rearwardly thereof at an axal distance $S_7$ is a double convex lens member VIII.

The complete objective 10 forms an image of superior flatness on image surface 14 of the object surface 13 at a magnification of 115.0×, the numerical aperture of the system being substantially .33, the resolution thereof being exceedingly high over the entire format of the image surface. The aforesaid lens properties mark a real achievement in projection lens design where said lens works with precision at finite conjugates. The field of said projection lens is also relatively large at a value of 23° considering the other properties thereof.

All of the foregoing advantages have been achieved in the present invention by a judicious combination of lens parameters chosen by computation and experimentation and combined herein as set forth in the tables of values herebelow.

The equivalent focal lengths of the front and rear lens groups 11 and 12 are designated $F_{11}$ and $-F_{12}$ respectively and have values in terms of F as given herebelow, wherein F designates the equivalent focal length of objective 10.

$$F_{11} = 1.7F$$
$$-F_{12} = 3.32F$$

With regard to the aforesaid lens members I to VIII, the corresponding equivalent focal lengths therefor are designated $F_I$ to $F_{VIII}$ and those which are negative are identified by a minus (−) sign. The theoretical values in terms of F for the focal lengths $F_I$ to $F_{VIII}$ are given in Table I herebelow,

TABLE I $F_I = \infty$
$F_{II} = 4.16F$
$F_{III} = 1.63F$
$-F_{IV} = 1.25F$
$F_V = .81F$
$F_{VI} = 2.34F$
$-F_{VII} = 1.99F$
$F_{VIII} = 5.61F$ Compound lens members II and IV comprising the above-mentioned lens elements IIa, IIb and IVa, IVb respectively have individual focal lengths which are designated respectively $-F_{IIa}$, $F_{IIb}$ and $F_{IVa}$, $-F_{IVb}$. The values thereof are given substantially in Table II herebelow,

TABLE II $$-F_{IIa} = 1.48F \text{ or } \frac{-F_{IIa}}{F_{IIb}} = 1.06 \text{ (Absolute)}$$
$$F_{IIb} = 1.39F$$

$$F_{IVa} = 2.46F \text{ or } \frac{F_{IVa}}{-F_{IVb}} = 2.66 \text{ (Absolute)}$$
$$-F_{IVb} = .92F$$

Due to the method of manufacture and assembly for producing the objective 10, all of the above nominal values may in practice be varied by a small amount from the nominal or ideal values as given in the foregoing or in the succeeding tables. In the aforesaid method, comparatively large numbers of each lens element in the objective 10 are produced according to good manufacturing standards having practical limits suitable for large scale production. The resultant nonideal lens parts depart slightly from the true nominal values as given in the specification and are given in tables of values appearing hereinafter.

Particularly the air spaces and lens thicknesses may be adjusted slightly by a skilled optician in such a way as to restore good optical performance to the objective 10. Having a multiplicity of lens parts with a range of slightly different corresponding lens parameters available to skilled operators, it is possible to assemble successfully a large proportion of nonideal objectives which perform well optically and are commercially acceptable.

In view of the foregoing explanation, the nominal values are given in terms of F for the successive lens radii $R_1$ to $-R_{18}$ in the following Tables III and IV, the minus (—) sign used with certain R values referring to lens surfaces which are concave toward the object surface 13.

TABLE III

Lens II $\begin{cases} \dfrac{-R_3}{R_4} = 1.0 \\ \dfrac{-R_3}{-R_5} = 1.56 \end{cases}$ Lens III $\begin{cases} \dfrac{R_6}{-R_7} = .59 \end{cases}$ Lens IV $\begin{cases} \dfrac{-R_8}{-R_9} = 1.66 \\ \dfrac{-R_8}{R_{10}} = .92 \end{cases}$ Absolute values Lens V $\begin{cases} \dfrac{-R_{11}}{-R_{12}} = 1.99 \end{cases}$ Lens VI $\begin{cases} \dfrac{R_{13}}{-R_{14}} = .73 \end{cases}$ Absolute value Lens VII $\begin{cases} -R_{15} = 2.09F \\ R_{16} > \pm 15.0F \end{cases}$ Lens VIII $\begin{cases} \dfrac{R_{17}}{-R_{18}} = 3.38 \end{cases}$ Absolute value

TABLE IV

| | |
|---|---|
| $R_1$ = Plano | $R_{10}$ = 1.67F |
| $R_2$ = Plano | $-R_{11}$ = 5.84F |
| $-R_3$ = 2.09F | $-R_{12}$ = 2.92F |
| $-R_4$ = 2.09F | $R_{13}$ = 2.74F |
| $-R_5$ = 1.33F | $-R_{14}$ = 3.72F |
| $R_6$ = 1.73F | $-R_{15}$ = 1.29F |
| $-R_7$ = 2.92F | $R_{16} > \pm 15.0F$ |
| $-R_8$ = 1.55F | $R_{17}$ = 17.4F |
| $-R_9$ = .93F | $-R_{18}$ = 5.15F |

Furthermore, in accordance with the foregoing explanation regarding lens parameter values, the ranges of values for the successive air spaces $S_1$ to $S_8$ and lens thicknesses $t_1$ to $t_{10}$ are given in Table V herebelow,

TABLE V

| | |
|---|---|
| $3.8F < S_1 < 5.9F$ | $.284F < t_2 < .30F$ |
| $.0113F < S_2 < 0.34F$ | $.462F < t_3 < .477F$ |
| $.164F < S_3 < .169F$ | $.378F < t_4 < .391F$ |
| $.189F < S_4 < .194F$ | $.535F < t_5 < .543F$ |
| $.0126F < S_5 < .020F$ | $.303F < t_6 < .311F$ |
| $3.02F < S_6 < 3.10F$ | $.358F < t_7 < .370F$ |
| $.108F < S_7 < .121F$ | $.417F < t_8 < .443F$ |
| $111.0F < S_8 < 113.0F$ | $.113F < t_9 < .139F$ |
| $.393F < t_1 < .40F$ | $.87F < t_{10} < .917F$ |

With respect to the refractive index $n_D$ and Abbe number $\nu$ of the glasses from which the lens parts I to VIII are made, the ranges of the absolute values therefor are given in Table VI herebelow,

TABLE VI
(Absolute values)

| | |
|---|---|
| $1.520 < n_D(I) < 1.530$ | $54.0 < \nu(I) < 63.0$ |
| $1.717 < n_D(IIa) < 1.723$ | $26.0 < \nu(IIa) < 32.0$ |
| $1.688 < n_D(IIb) < 1.694$ | $51.0 < \nu(IIb) < 58.0$ |
| $1.688 < n_D(III) < 1.694$ | $51.0 < \nu(III) < 58.0$ |
| $1.688 < n_D(IVa) < 1.694$ | $51.0 < \nu(IVa) < 58.0$ |
| $1.613 < n_D(IVb) < 1.621$ | $33.0 < \nu(IVb) < 40.0$ |
| $1.688 < n_D(V) < 1.694$ | $51.0 < \nu(V) < 58.0$ |
| $1.688 < n_D(VI) < 1.694$ | $51.0 < \nu(VI) < 58.0$ |
| $1.688 < n_D(VII) < 1.694$ | $51.0 < \nu(VII) < 58.0$ |
| $1.717 < n_D(VIII) < 1.723$ | $26.0 < \nu(VIII) < 32.0$ |

With regard to the nominal absolute values of the $n_D$ and $\nu$ quantities, the numerical relationships therebetween for the elements of lens members II and IV as well as between the lens members VII and VIII are given in Table VII herebelow,

TABLE VII $$n_D(IIa) - n_D(IIb) = .029$$
$$n_D(Va) - n_D(Vb) = 0.74$$
$$n_D(VII) - n_D(VIII) = .029$$
$$\nu(IIb) - \nu(IIa) = 15.5$$
$$\nu(IVa) - \nu(IVb) = 18.2$$
$$\nu(VII) - \nu(VIII) = 15.5$$

In this reversed-order sequence, the positive lens element has the highest $n_D$ value whereby field flatness and spherical aberration of the image is improved.

The nominal values in the preferred objective 10 in terms of F for the air spaces $S_1$ to $S_8$ and lens thicknesses $t_1$ to $t_{10}$ are given in Table VIII herebelow,

TABLE VIII

| | |
|---|---|
| $S_1 = .537F$ | $t_2 = .288F$ |
| $S_2 = .025F$ | $t_3 = .47F$ |
| $S_3 = .167F$ | $t_4 = .386F$ |
| $S_4 = .192F$ | $t_5 = .537F$ |
| $S_5 = .0167F$ | $t_6 = .307F$ |
| $S_6 = 3.06F$ | $t_7 = .363F$ |
| $S_7 = .115F$ | $t_8 = .43F$ |
| $S_8 = 112.0F$ | $t_9 = .126F$ |
| $t_1 = .399F$ | $t_{10} = .89F$ |

Furthermore, the nominal absolute values of the refractive index $n_D$ and Abbe number $\nu$ for the glasses in the successive lens parts I to VIII are given in Table IX herebelow,

TABLE IX
(Absolute values)

| | |
|---|---|
| $n_D(I) = 1.526$ | $\nu(I) = 58.7$ |
| $n_D(IIa) = 1.720$ | $\nu(IIa) = 29.3$ |
| $n_D(IIb) = 1.691$ | $\nu(IIb) = 54.8$ |
| $n_D(III) = 1.691$ | $\nu(III) = 54.8$ |
| $nD(IVa) = 1.691$ | $\nu(IVa) = 54.8$ |
| $n_D(IVb) = 1.617$ | $\nu(IVb) = 36.6$ |
| $n_D(V) = 1.691$ | $\nu(V) = 54.8$ |
| $n_D(VI) = 1.691$ | $\nu(VI) = 54.8$ |
| $n_D(VII) = 1.691$ | $\nu(VII) = 54.8$ |
| $n_D(VIII) = 1.720$ | $\nu(VIII) = 29.3$ |

It will be perceived from the foregoing description that there is here provided a wide angle type of projection objective of the reversed telephoto kind having a high magnification and abnormally high numerical aperture, similar in use to a microscope objective; that compared to microscope objectives of 150× magnification, the angular field of 23° is relatively large. It will further be evident that the field is remarkably flat over the entire format and the superior resolution of said objective is a chief characteristic thereof.

Although only one form of the present invention has been shown and described in detail, infinite number of variations of the preferred form having near-nominal values of lens parameters may be constructed which result in good optical performance as above mentioned.

I claim:

1. An image forming optical projection system of the reversed telephoto type working at finite conjugates and having a high magnification and numerical aperture of substantially 115× and .33 respectively and a total useful field angle at least as great as 23° along with an excellent high resolution and very flat field over the entire format, said system having a collective front lens group optically aligned with a rear dispersive group, said collective group including:

a plane parallel cover glass lying substantially in contact with an object to be projected and designated I, a positive meniscus lens member designated II and having a concave surface facing said object and being spaced at an axial distance $S_1$ therefrom, said member including a double concave lens member designated IIa which lies in contact with a rear double convex lens member designated IIb, a double convex singlet lens member spaced rearwardly therefrom by an axial distance designated $S_2$, said singlet being designated III, a double concave compound lens member designated IV spaced rearwardly of lens member III by an axial distance designated $S_3$, said member IV including a front positive meniscus lens element designated IVa which lies in contact with a rear double concave lens element IVb, a positive meniscus lens member designated V having a concave surface facing lens member IV and spaced therefrom by an axial distance designated $S_4$, a double convex lens member designated VI spaced rearwardly of lens V at an axial distance designated $S_5$, a negative lens member designated VII and having a concave surface facing lens member VI and spaced therefrom at a very large axial distance designated $S_6$, and a rearmost double convex singlet lens member designated VIII which is spaced at an axial distance designated $S_7$ from lens VII and at an axial projection distance of $S_8$ from the image produced by said system, the values of the equivalent focal lengths $F_I$ to $F_{VIII}$ respectively of the successive lens members I to VIII being given substantially in the table herebelow in terms of F which represents the equivalent focal length of said system, wherein the minus (−) sign indicates negative focal length, $$F_I = \infty$$
$$F_{II} = 4.16F$$
$$F_{III} = 1.63F$$
$$-F_{IV} = 1.25F$$
$$F_V = .81F$$
$$F_{VI} = 2.34F$$
$$-F_{VII} = 1.99F$$
$$F_{VIII} = 5.61F$$

the lens elements IIb, III, IVa, V, VI and VII being made of glass of the same kind having a refractive index absolute value between 1.688 and 1.694, and having an Abbe number absolute value between 51.0 and 58.0.

the numerical difference between the refractive index absolute values for the lens elements IIa and IIb being substantially .029; and the numerical difference between the refractive index absolute values for the lens elements IVa and IVb being substantially .074, the numerical difference between the Abbe number absolute values for lens elements IIb and IIa being substantially 15.5, and the corresponding difference between the Abbe number absolute values for lens elements IVa and IVb being substantially 18.2, the successive lens members II to VIII having air spaces $S_1$ to $S_8$ therebetween rearwardly of cover glass I which have their values stated in terms of F in the table herebelow, $$3.8F < S_1 < 5.9F$$
$$.011F < S_2 < .034F$$
$$.164F < S_3 < .169F$$
$$.189F < S_4 < .194F$$
$$.0126F < S_5 < .020F$$
$$3.02F < S_6 < 3.10F$$
$$.108F < S_7 < .121F$$
$$111.0F < S_8 < 113.0F$$

the optical parts I to VIII having respective axial thicknesses designated $t_1$ to $t_{10}$ which have values in terms of F as given in the table herebelow, $$.393F < t_1 < .40F$$
$$.284F < t_2 < .30F$$
$$.462F < t_3 < .477F$$
$$.378F < t_4 < .391F$$
$$.535F < t_5 < .543F$$
$$.303F < t_6 < .311F$$
$$.358F < t_7 < .370F$$
$$.417F < t_8 < .443F$$
$$.113F < t_9 < .139F$$
$$.87F < t_{10} < .917F$$

2. An image forming optical projection system substantially as set forth in claim 1 further characterized by: the focal lengths $-F_{IIa}$ and $F_{IIb}$ of the lens elements IIa and IIb respectively comprised in lens member II having values which are related numerically to each other as stated herebelow, $$-F_{IIa}/F_{IIb} = 1.06 \text{ (Absolute)}$$

and the focal lengths $F_{IVa}$ and $-F_{IVb}$ of the lens elements IVa and IVb respectively comprised in lens member IV having values which are related numerically to each other as stated herebelow, $$F_{IVa}/-F_{IVb} = 2.66 \text{ (Absolute)}$$

3. An image forming optical projection system of the reversed telephoto type working at finite conjugates and having a high magnification and numerical aperture of substantially 115× and .33 respectively and a total useful field angle at least as great as 23° along with an excellent high resolution and very flat field over the entire format, said system having a collective front lens group optically aligned with a rear dispersive group, said collective group including:
   a plane parallel cover glass lying substantially in contact with an object to be projected and designated II,
   a positive meniscus lens member designated II and having a concave surface facing said object and being spaced at an axial distance $S_1$ therefrom, said member including a double concave lens member designated IIa which lies in contact with a rear double convex lens member designated IIb,
   a double convex singlet lens member spaced rearwardly therefrom by an axial distance designated $S_2$, said singlet being designated III,
   a double concave compound lens member designated IV spaced rearwardly of lens member III by an axial distance designated $S_3$, said member IV including a front positive meniscus lens element designated IVa which lies in contact with a rear double concave lens element IVb,
   a positive meniscus lens member designated V having a concave surface facing lens member IV and spaced therefrom by an axial distance designated $S_4$,
   a double convex lens member designated VI spaced rearwardly of lens V at an axial distance designated $S_5$,
   a negative lens member designated VII and having a concave surface facing lens member VI and spaced therefrom at a very large axial distance designated $S_6$, and
   a rearmost double convex singlet lens member designated VIII which is spaced at an axial distance designated $S_7$ from lens VII and at an axial projection distance of $S_8$ from the image produced by said system,
   the numerical values for the radii of the successive refractive surfaces $R_1$ to $-R_{18}$ of the optical elements I to VIII being related to each other as stated in the table herebelow, the minus (—) sign being used with all refractive surfaces which are concave toward the object, Lens II $\begin{cases} \dfrac{-R_3}{R_4} = 1.0 \text{ (Absolute value)} \\ \dfrac{-R_3}{-R_5} = 1.56 \text{ (Absolute value)} \end{cases}$ Lens III $\begin{cases} \dfrac{R_6}{-R_7} = .59 \text{ (Absolute value)} \end{cases}$ Lens IV $\begin{cases} \dfrac{-R_8}{-R_9} = 1.66 \text{ (Absolute value)} \\ \dfrac{-R_8}{R_{10}} = .92 \text{ (Absolute value)} \end{cases}$ Lens V $\begin{cases} \dfrac{-R_{11}}{-R_{12}} = 1.99 \text{ (Absolute value)} \end{cases}$ Lens VI $\begin{cases} \dfrac{R_{13}}{-R_{14}} = .73 \text{ (Absolute value)} \end{cases}$ Lens VII $\begin{cases} -R_{15} = 2.09 \ F \\ R_{16} > \pm 15.0 \ F \end{cases}$ Lens VIII $\begin{cases} \dfrac{R_{17}}{-R_{18}} = 3.38 \text{ (Absolute value)} \end{cases}$ the lens elements IIb, III, IVa, V, VI and VII being made of glass of the same kind having a refractive index absolute value between 1.688 and 1.694, and having an Abbe number absolute value between 51.0 and 58.0,
   the numerical difference between the refractive index absolute values for the lens elements IIa and IIb being substantially .029; and the numerical difference between the refractive index absolute values for the lens elements IVa and IVb being substantially .074,
   the numerical difference between the Abbe number absolute values for lens elements IIb and IIa being substantially 15.5, and the corresponding difference between the Abbe number absolute values for lens elements IVa and IVb being substantially 18.2,
   the successive lens members II to VIII having air spaces $S_1$ to $S_8$ therebetween rearwardly of cover glass I which have their values stated in terms of F in the table herebelow, $$3.8F < S_1 < 5.9F$$
$$.011F < S_2 < .034F$$
$$.164F < S_3 < .169F$$
$$.189F < S_4 < .194F$$
$$.0126F < S_5 < .020F$$
$$3.02F < S_6 < 3.10F$$
$$.108F < S_7 < .121F$$
$$111.0F < S_8 < 113.0F$$

the optical parts I to VIII having respective axial thicknesses designated $t_1$ to $t_{10}$ which have values in terms of F as given in the table herebelow, $$.393F < t_1 < .40F$$
$$.284F < t_2 < .30F$$
$$.462F < t_3 < .477F$$
$$.378F < t_4 < .391F$$
$$.535F < t_5 < .543F$$
$$.303F < t_6 < .311F$$
$$.358F < t_7 < .370F$$
$$.417F < t_8 < .443F$$
$$.113F < t_9 < .139F$$
$$.87F < t_{10} < .917F$$

4. An image forming optical projection system of the reversed telephoto type working at finite conjugates and having a high magnification and numerical aperture of substantially 115× and .33 respectively and a total useful field angle at least as great as 23° along with an excellent high resolution and very flat field over the entire format, said system having a collective front lens group optically aligned with a rear dispersive group, said collective group including:
   a plane parallel cover glass lying substantially in contact wtih an object to be projected and designated I,
   a positive meniscus lens member designated II and having a concave surface facing said object and being spaced at an axial distance $S_1$ therefrom, said member including a double concave lens member designated IIa which lies in contact with a rear double convex lens member designated IIb,
   a double convex singlet lens member spaced rearwardly therefrom by an axial distance designated $S_2$, said singlet being designated III,
   a double concave compound lens member designated IV spaced rearwardly of lens member III by an axial distance designated $S_3$, said member IV including a front positive meniscus lens element designated IVa which lies in contact wtih a rear double concave lens element IVb,
   a positive meniscus lens member designated V having a concave surface facing lens member IV and spaced therefrom by an axial distance designated $S_4$,
   a double convex lens member designated VI spaced rearwardly of lens V at an axial distance designated $S_5$,
   a negative lens member designated VII and having a concave surface facing lens member VI and spaced therefrom at a very large axial distance designated $S_6$, and
   a rearmost double convex singlet lens member designated VIII which is spaced at an axial distance designated $S_7$ from lens VII and at an axial projection distance of $S_8$ from the image produced by said system,
   the values of the equivalent focal lengths $F_I$ to $F_{VIII}$ respectively of the successive lens members I to VIII being given substantially in the Table I herebelow in terms of F which represents the equivalent focal length of said system, wherein the minus (—) sign indicates negative focal length, $$F_I = \infty$$
$$F_{II} = 4.16F$$
$$F_{III} = 1.63F$$
$$-F_{IV} = 1.25F$$
$$F_V = .81F$$
$$F_{VI} = 2.34F$$
$$-F_{VII} = 1.99F$$
$$F_{VIII} = 5.61F$$

the successive axial air spaces $S_1$ to $S_8$ between the optical parts I to VIII having values in terms of F substantially as given in the table herebelow along with the values in terms of F for the successive axial lens thicknesses thereof,

| | |
|---|---|
| $S_1 = .537F$ | $t_1 = .399F$ |
| $S_2 = .025F$ | $t_2 = .288F$ |
| $S_3 = .167F$ | $t_3 = .475F$ |
| $S_4 = .192F$ | $t_4 = .386F$ |
| $S_5 = .016F$ | $t_5 = .537F$ |
| $S_6 = 3.06F$ | $t_6 = .307F$ |
| $S_7 = .115F$ | $t_7 = .363F$ |
| $S_8 = 112.0F$ | $t_8 = .43F$ |
| | $t_9 = .126F$ |
| | $t_{10} = .89F$ | the refractive index $n_D$ and Abbe number $\nu$ of the glass used in the optical parts I to VIII having absolute values substantially as given in the following table,

| | |
|---|---|
| $n_D(I) = 1.526$ | $\nu(I) = 58.7$ |
| $n_D(IIa) = 1.720$ | $\nu(IIa) = 29.3$ |
| $n_D(IIb) = 1.691$ | $\nu(IIb) = 54.8$ |
| $n_D(III) = 1.691$ | $\nu(III) = 54.8$ |
| $n_D(IVa) = 1.691$ | $\nu(IVa) = 54.8$ |
| $n_D(IVb) = 1.617$ | $\nu(IVb) = 36.6$ |
| $n_D(V) = 1.691$ | $\nu(V) = 54.8$ |
| $n_D(VI) = 1.691$ | $\nu(VI) = 54.8$ |
| $n_D(VII) = 1.691$ | $\nu(VII) = 54.8$ |
| $n_D(VIII) = 1.720$ | $\nu(VIII) = 29.3$ |

5. An image forming optical projection system of the reversed telephoto type working as finite conjugates and having a high magnification and numerical aperture of substantially 115× and .33 respectively and a total useful field angle at least as great as 23° along with an excellent high resolution and very flat field over the entire format, said system having a collective front lens group optically aligned with a rear dispersive group, said collective group including:

a plane parallel cover glass lying substantially in contact with an object to be projected and designated I, a positive meniscus lens member designated II and having a concave surface facing said object and being spaced at an axial distance $S_1$ therefrom, said member including a double concave lens member designated IIa which lies in contact with a rear double convex lens member designated IIb, a double convex singlet lens member spaced rearwardly therefrom by an axial distance designated $S_2$, said singlet being designated III, a double concave compound lens member designated IV spaced rearwardly of lens member III by an axial distance designated $S_3$, said member IV including a front positive meniscus lens element designated IVa which lies in contact with a rear double concave lens element IVb, a positive meniscus lens member designated V having a concave surface facing lens member IV and spaced therefrom by an axial distance designated $S_4$, a double convex lens member designated VI spaced rearwardly of lens V at an axial distance designated $S_5$, a negative lens member designated VII and having a concave surface facing lens member VI and spaced therefrom at a very large axial distance designated $S_6$, and a rearmost double convex singlet lens member designated VIII which is spaced at an axial distance designated $S_7$ from lens VII and at an axial projection distance of $S_8$ from the image produced by said system, the values in terms of F for the successive radii of the optical surfaces being designated $R_1$ to $-R_{18}$ in the table herebelow and the minus (—) sign used with certain R designations signifying that the centers of such surfaces lie on the object side thereof,

| | |
|---|---|
| $R_1 = $ Plano | $R_{10} = 1.67F$ |
| $R_2 = $ Plano | $-R_{11} = 5.84F$ |
| $-R_3 = 2.09F$ | $-R_{12} = 2.92F$ |
| $R_4 = 2.09F$ | $R_{13} = 2.74F$ |
| $-R_5 = 1.33F$ | $-R_{14} = 3.72F$ |
| $R_6 = 1.73F$ | $-R_{15} = 1.29F$ |
| $-R_7 = 2.92F$ | $R_{16} > \pm 15.0F$ |
| $-R_8 = 1.55F$ | $R_{17} = 17.4F$ |
| $-R_9 = .93F$ | $-R_{18} = 5.15F$ | the successive axial air space $S_1$ to $S_8$ between the optical parts I to VIII having values in terms of F substantially as given in the table herebelow along with the values in terms of F for the successive axial lens thicknesses thereof,

| | |
|---|---|
| $S_1 = .537F$ | $t_1 = .399F$ |
| $S_2 = .025F$ | $t_2 = .288F$ |
| $S_3 = .167F$ | $t_3 = .475F$ |
| $S_4 = .192F$ | $t_4 = .386F$ |
| $S_5 = .016F$ | $t_5 = .537F$ |
| $S_6 = 3.06F$ | $t_6 = .307F$ |
| $S_7 = .115F$ | $t_7 = .363F$ |
| $S_8 = 112.0F$ | $t_8 = .43F$ |
| | $t_9 = .126F$ |
| | $t_{10} = .89F$ | the refractive index $n_D$ and Abbe number $\nu$ of the glass used in the optical parts I to VIII having absolute values substantially as given in the following table,

| | |
|---|---|
| $n_D(I) = 1.526$ | $\nu(I) = 58.7$ |
| $n_D(IIa) = 1.720$ | $\nu(IIa) = 29.3$ |
| $n_D(IIb) = 1.691$ | $\nu(IIb) = 54.8$ |
| $n_D(III) = 1.691$ | $\nu(III) = 54.8$ |
| $n_D(IVa) = 1.691$ | $\nu(IVa) = 54.8$ |
| $n_D(IVb) = 1.617$ | $\nu(IVb) = 36.6$ |
| $n_D(V) = 1.691$ | $\nu(V) = 54.8$ |
| $n_D(VI) = 1.691$ | $\nu(VI) = 54.8$ |
| $n_D(VII) = 1.691$ | $\nu(VII) = 54.8$ |
| $n_D(VIII) = 1.720$ | $\nu(VIII) = 29.3$ |

References Cited

UNITED STATES PATENTS 3,328,111   6/1967   Bennett et al. _____ 350—214

JOHN K. CORBIN, *Primary Examiner.*